United States Patent [19]

McMann, Jr.

[11] Patent Number: 4,536,799
[45] Date of Patent: Aug. 20, 1985

[54] TELEVISION METHOD AND APPARATUS

[75] Inventor: Renville H. McMann, Jr., New Canaan, Conn.

[73] Assignee: Thomson-CSF Broadcast, Inc., Stamford, Conn.

[21] Appl. No.: 427,899

[22] Filed: Sep. 29, 1982

[51] Int. Cl.³ .............................................. H01N 5/38
[52] U.S. Cl. ................................... 358/219; 358/217
[58] Field of Search ............... 358/211, 217, 219, 212, 358/167

[56] References Cited

U.S. PATENT DOCUMENTS 3,090,829 5/1963 Lee et al. ............................. 358/211
3,716,657 2/1973 Niemyer, Jr. .

Primary Examiner—Gene Z. Rubinson
Assistant Examiner—Robert Lev
Attorney, Agent, or Firm—Martin M. Novack

[57] ABSTRACT

The disclosed technique effectively increases television camera sensitivity by allowing additional time for signal to build up on the photoconductive surface of the camera tube. Rapid motion portrayal is traded off against sensitivity improvement, since picture information is available at a slower rate.

16 Claims, 3 Drawing Figures

TELEVISION METHOD AND APPARATUS

BACKGROUND OF THE INVENTION

This invention relates to television techniques and, more particularly, to an improved television system and method that effectively increases the sensitivity of a television camera.

Television cameras generally require relatively high light levels for proper operation. Under studio conditions, this is typically not a problem. Outside the studio, however, such as in electronic news gathering applications, the amount of light that is available may be below the level necessary for good video quality. If natural or artificial light is insufficiently available, it may be necessary to use a wide camera lens aperture in order to capture the light necessary for a reasonable signal-to-noise level in the resultant video signal. Even the widest lens opening may be insufficient, though. Also, as is well known, certain disadvantages, such as restricted depth of field, will be a consequence of employing an unduly wide lens aperture.

It is among the objects of the present invention to provide a video system which enhances the effectiveness of the light sensed by a television camera. At very low light levels, an objective is to generate a video signal having improved signal-to-noise ratio, thereby allowing the generation of picture information when conditions would have normally prevented attainment of a picture. Also, in situations where the light level would have been sufficient to obtain a picture using existing techniques, it is an object of the invention to permit operation with a smaller camera lens aperture so as to gain the attendant advantages of such operation.

SUMMARY OF THE INVENTION

The present invention takes into account, inter alia, a characteristic of video camera operation that is presently limiting on the effective light sensitivity efficiency of the video camera tube. Applicant has noted that the accumulation of charge (resulting from exposure by light) on the photoconductive surface of the video camera tube at the scanline positions of the given video field are affected when adjacent scanlines are scanned, for example, during the scanning of an adjacent interlaced field. In particular, the buildup of charge on the photosensitive screen regions corresponding to the scanlines of the field not presently being scanned are adversely affected by the scanning of the adjacent scanlines in the next field.

For example, assume that a given picture element on an even numbered scanline 2n was just "read" (discharged) by the scanning beam of the camera tube. Ideally, this elemental region would then have a full frame time during which the exposing light impinging on the elemental region would cause the buildup of electric charge that becomes the video signal at that point the next time that the scanning beam reads the picture element. In actuality, however, applicant has noted that when the adjacent scanlines of the interlaced frame, i.e., lines (2n−1) and (2n+1), are scanned, there is a discharging effect on the elemental picture regions of line 2n. This means that the elemental region on line 2n has something closer to one field time (or one-half a frame time) in which the impinging light can cause the buildup of charge. As a result, the signal level is lower than one would have if this phenomenon were not occurring, and, hence, the signal-to-noise ratio of the output video signal is adversely affected. The effect is, of course, the same for odd and even fields.

The present invention is directed to a television technique and system which includes a television camera and means for generating periodic field scanning signals that are applied to the television camera. In accordance with a feature of the invention, means are provided for disabling the scanning beam of the television camera during a predetermined non-unity fraction of a series of field times, so that in the output of the camera a regular video field is followed by at least one blanked-out video field. In an embodiment hereof, two out of every three video fields are blanked-out, although other fractions can be used. Means are provided for generating, during occurrence of each blanked-out field, a substitute video field derived from a previously occurring regular video field.

In the preferred embodiment of the invention, means are provided for inserting an identifying signal in each blanked-out field. In this embodiment, the means for generating a substitute video field during the occurrence of each blanked-out field includes means for storing a regular video field. The identifying signal of each blanked-out video field is detected, and the stored video is read out during the field time of the identified blanked-out video field.

The present invention effectively increases camera sensitivity by allowing more time for signal to build up on the photoconductive surface of the camera tube. Rapid motion portrayal is traded off against sensitivity improvement, since picture information is available at a slower rate.

Further features and advantages of the invention will become more readily apparent from the following detailed description when taken in conjunction with the accompanying drawings.

DESCRIPTION OF THE PREFERRED EMBODIMENT

Figure 1:
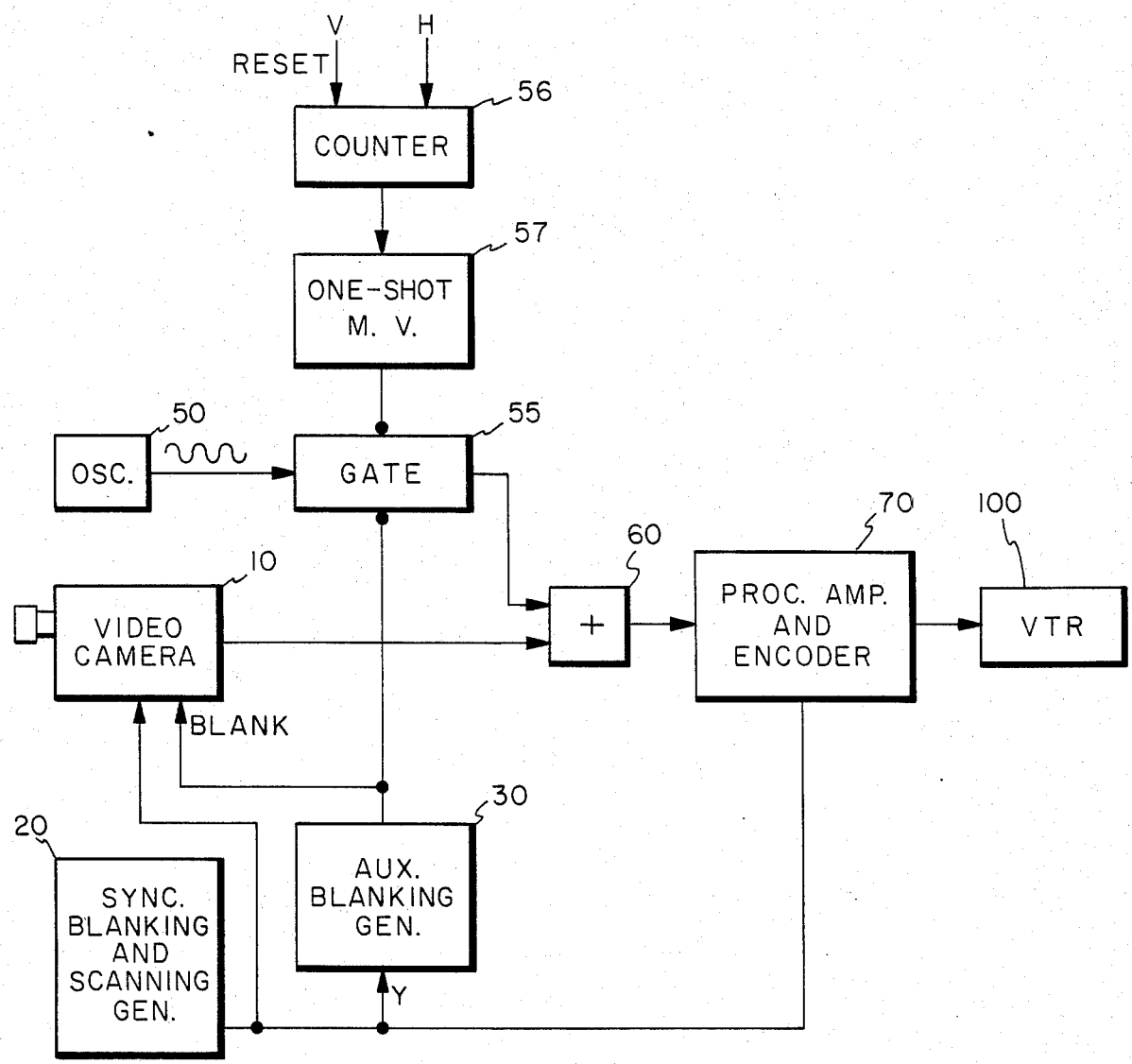
FIG. 1 is a block diagram of a system for generating a television signal in accordance with an embodiment of the invention.

Referring to FIG. 1, there is shown a block diagram of an apparatus in accordance with the invention and which can be used to practice the method of the invention. A television camera 10 may be a monochrome or a color camera. Sync, blanking and scanning are conventionally applied from generator 20. The output of generator 20 is also available to an auxiliary blanking generator 30 which, in the present embodiment, comprises a count-to-three counter that generates an output during two of its three possible counts. The counter is responsive to the vertical sync signal, so an output is generated during two out of every three video fields in this embodiment. The output of auxiliary blanking generator 30 is applied to the camera 10 to blank out the scanning beam thereof, such as by suitable disabling via grid 2, the cathode, or any other means.

An identifying signal is preferably applied to each field that is blanked out. In the present embodiment, a burst of 1 megahertz signal is applied during line 9 of each blanked-out field. An oscillator 50 generates a 1 MHz. signal that is input to a gate 55. The gate 55 is enabled by the output of a count-to-nine line counter 56. The line counter is reset at the beginning of each field (using V from generator 20), and the lines of the field are then counted (using H from generator 20), with an output being coupled to the gate 55 when a count of nine is reached. The output of the counter 56 is applied to the gate 55 via one-shot multivibrator 57 which controls the duration of the burst of 1 MHz. signal. The output of auxiliary blanking generator 30 is also coupled as an enable to the gate 55 so that the identifying signal is only passed during the blanked-out fields. The output of gate 55 is added to the output of camera 10 by summer 60 whose output is, in turn, coupled to conventional processing amplifier and encoder 70. The output of encoder 70 is illustrated as being coupled to video tape recorder 100, but the television signal could alternatively be transmitted for display or storage or directly processed and displayed in accordance with the circuitry of FIG. 2.

Figure 2:
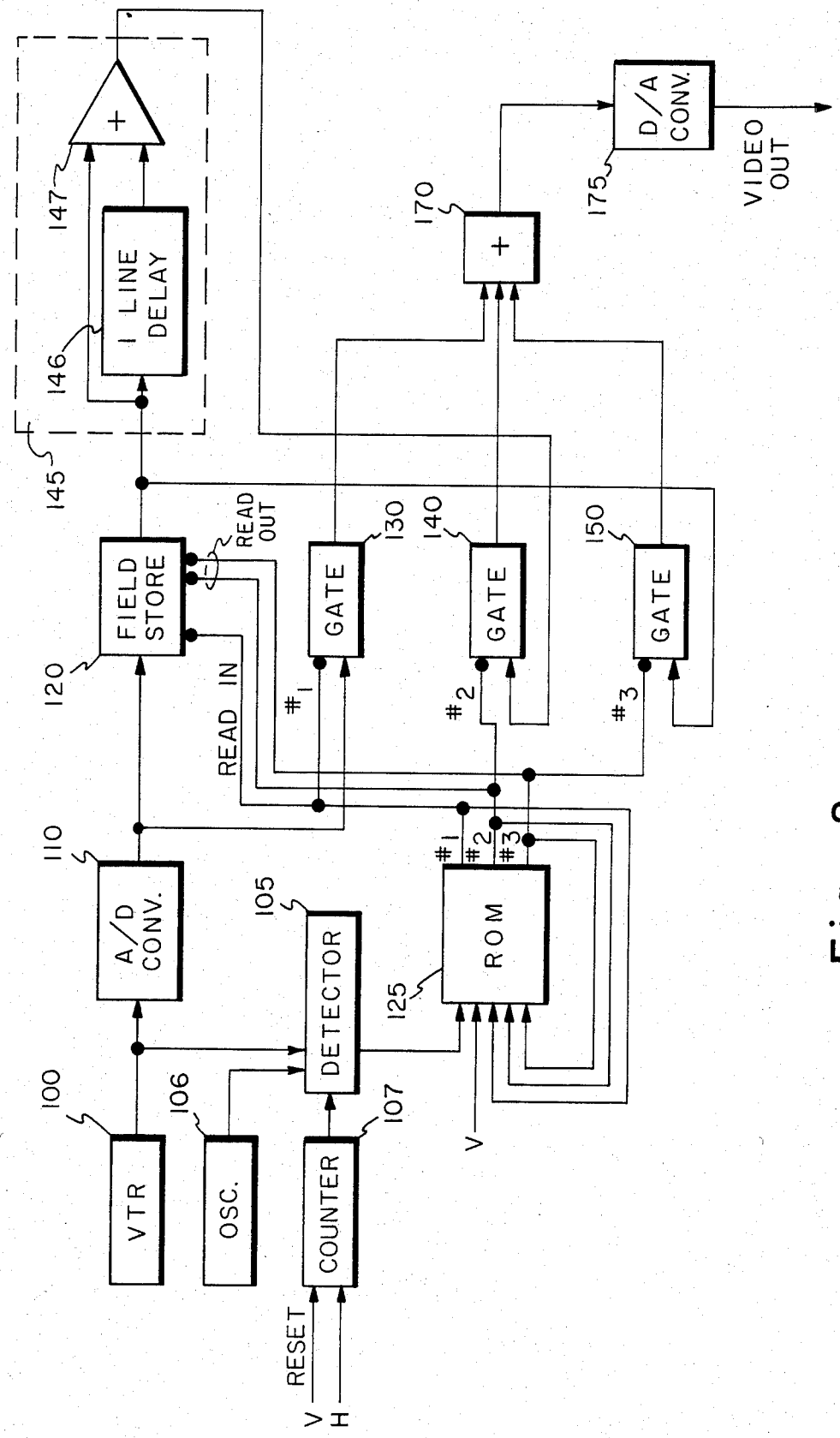
FIG. 2 is a block diagram of a system in accordance with an embodiment of the invention for processing the television signal obtained with the system of FIG. 1.

FIG. 2 illustrates the processing of the television signal hereof which include the blanked-out fields. In the present embodiment, the video signal is illustrated as being output from video tape recorder 100 and received by an analog-to-digital converter 110 which may be of a commercially available type that is used for digitizing a video signal. The output of analog-to-digital converter 110 is coupled to a digital field store 120 which, again, may be of a commercially available type, and also to the input of a gate 130.

The output of video tape recorder 100 is also coupled to a detector 105 which is used to detect the presence of the identifying signal in those fields which are blanked-out. The detector 105 receives a local 1 MHz. signal from oscillator 106. The detector is enabled to detect the presence of the identification signal by line counter 107 which generates an enabling signal during line 9 of each field. The signals V and H are conventionally available from the video tape recorder. When the identification signal is present, the detector 105 generates an output that is coupled to read-only memory (ROM) 125. The ROM 125 also receives an indication of each new field, V. The ROM 125 has three output lines designated 1, 2, and 3 which correspond to the field numbers of a three field video sequence; viz., a regular video field containing picture information, a blanked-out video field, and another blanked-out video field, respectively. The output states of the ROM are also available as inputs to the ROM, and it is set to operate in accordance with the following input/output rules: When in an output state indicating field #3, the next field, in the absence of an identification signal, will result in an output state indicative of field #1 of a new sequence. When in an output state indicating field #1, the next field, in conjunction with a detected identification signal, will result in an output state indicative of field #2 of the sequence. Finally, when in an output state indicative of field #2, the next field, again in conjunction with a detected identification signal, will result in an output state indicative of field #3 of the sequence. The output states continue in this manner.

The outputs respectively representative of the presence of field #1, field #2, and field #3 are respectively coupled to the enable terminals of gates 130, 140, and 150. The output indicative of the presence of field #1 is also coupled to the field store 120 to enable the read-in of a new field of video. The outputs indicative of field #2 and field #3 are also coupled to the field store 120 to enable the read-out of the field of video stored therein.

The output of field store 120 is coupled to the input of gate 150. The output of the field store 120 is also coupled to the input of gate 140 via line interpolation circuit 145. The interpolation circuit may be of the type disclosed in U.S. Pat. No. 4,027,333, and includes a one line delay 146 and a summer 147. The summer is operative to add, with a gain of 0.5, an undelayed line of video with the previously stored line of video, thereby effectively averaging each pair of successive lines of a field. The outputs of gates 130, 140, and 150 are coupled to summer 170. The output of the summer 170 is, in turn, coupled to a digital-to-analog converter 175 whose output is the reconstituted analog video signal.

Figure 3:
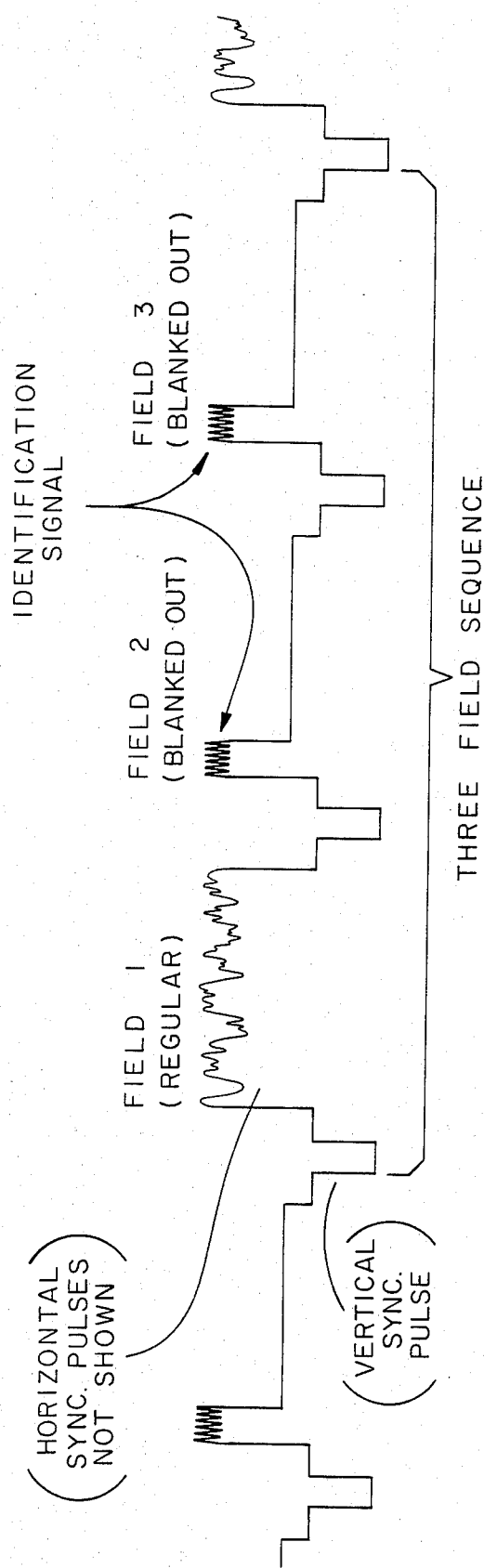
FIG. 3 is a simplified diagram of a series of field times which illustrate a sequence of regular and blanked-out fields as utilized in the invention.

Operation of the FIG. 2 subsystem can be more readily understood with the aid of the simplified diagram of FIG. 3 which shows a series of video fields, including a bracketed sequence of field times designated field #1, field #2 and field #3. It is seen that field #1 is a regular video field including video information obtained during scanning of the camera tube beam (or beams, if color). As described in conjunction with FIG. 1, in the present embodiment the next two fields of the sequence are blanked-out, and an identifying signal is provided in the portion of each field that occurs before the expected video picture information. In operation, the identification signal detector 105, in conjunction with the ROM 125 generates an output signal on a line that is indicative of which field time of the sequence is present. During field #1 of the sequence, the digitized video information is coupled to summer 170 via gate 130, and the field store 120 is enabled to store the regular field of picture information. During the field times #2 and #3 of the sequence, when the blanked-out fields are sensed by identification signal detector 105, and one of the gates 140 or 150, as the case may be, is enabled, the frame of picture information in the field store is repeated and coupled to the summer 170 via its associated enabled gate 140 or 150. In the case of field #2 (which is of opposite sense than field #1; i.e., either field #1 is odd and field #2 is even, or field #2 is even and field #1 is odd), line interpolation can be used, as is known in the art, to interpolate between scanlines of a stored field when generating an in-between line of the next field. For example, assume that the first field of a particular three field sequence is an odd field, $(2k+1)$, which is stored in the field store 120. The next field of the sequence, i.e., an even field which can be designated as field $(2k+2)$, is to be generated by using the stored field information from the previous field $(2k+1)$. Now, assume that a particular even line $(2n+2)$ of field $(2k+2)$ is to be generated using the picture information from the stored previous field, $(2k+1)$. The line interpolation technique is effective to average the inforamtion from lines $(2n+1)$ and $(2n+3)$ of the stored odd field $(2k+1)$ to obtain an in-between even line $(2n+2)$ of reconstituted even field $(2k+2)$.

Line interpolation is not used when the stored field is read out (via gate 150) to reconstitute field #3 of the sequence, since field #3 is of the same sense (both odd, or both even) as field #1, and the corresponding line numbers are at the same position of a video frame.

In the described embodiment, the blanking of two out of every three fields still allows no more than one field of each sense (odd and even) to be skipped before a regular field of that sense is available.

The invention has been described with reference to a particular embodiment, but variations within the spirit and scope of the invention will occur to those skilled in the art. For example, it will be understood that different types of identification signals can be employed. Also, either digital or analog processing can be used in either forming or reconstituting the television signal hereof. Further, the blanked-out video fields can be modified in any desired way to be compatible with storage or transmission media, such as by inserting a pedestal to stabilize the automatic gain control of a video tape recorder. Finally, it will be understood that different numbers of fields can be blanked out, and alternative types of memory or sequencer can be employed to control generation of the reconstituted video signal.

I claim:

1. A television system, comprising:
   a television camera;
   means for generating periodic field scanning signals;
   means for applying said field scanning signals to said television camera;
   means for disabling the scanning beam of said television camera during a predetermined non-unity fraction of a series of field times so that in the output of said camera a regular video field is followed by at least one blanked-out video field;
   means responsive to said disabling means for inserting an identifying signal in each blanked-out field;
   means for generating, during occurrence of each blanked-out field, a substitute video field derived from a previously occurring regular video field.

2. The system as defined by claim 1, wherein said means for generating a substitute video field during the occurrence of each blanked-out field comprises:
   means for storing a regular video field;
   means for detecting the identifying signal of each blanked-out video field; and
   means for reading out the stored video during the field time of the identified blanked-out video field.

3. The system as defined by claim 2, further comprising means for sequentially combining regular video fields and generated substitute video fields.

4. The system as defined by claim 1, wherein said disabling means is operative to blank out two out of every three video fields so that a regular video field is followed by two blanked-out fields.

5. The system as defined by claim 2, wherein said disabling means is operative to blank out two out of every three video fields so that a regular video field is followed by two blanked-out fields.

6. The system as defined by claim 2, wherein said means for storing a regular video field comprises a digital frame store.

7. The system as defined by claim 1, wherein said means for inserting an identifying signal comprises a source of oscillatory signal and means responsive to said disabling means for adding said oscillatory signal to said blanked-out field during a selected scanline thereof.

8. The system as defined by claim 2, wherein said means for inserting an identifying signal comprises a source of oscillatory signal and means responsive to said disabling means for adding said oscillatory signal to said blanked-out field during a selected scanline thereof.

9. The system as defined by claim 3, wherein said means for inserting an identifying signal comprises a source of oscillatory signal and means responsive to said disabling means for adding said oscillatory signal to said blanked-out field during a selected scanline thereof.

10. Apparatus for generating and recording a television signal, comprising:
    a television camera;
    means for generating periodic field scanning signals;
    means for applying said field scanning signals to said television camera;
    means for disabling the scanning beam of said television camera during a predetemined non-unity fraction of a series of field times so that in the output of said camera a regular video field is followed by at least one blanked-out video field;
    means responsive to said disabling means for inserting an identifying signal in each blanked-out video field; and
    means for recording the resultant television signal.

11. For use in conjunction with a television system which includes a television camera and a source of periodic field scanning signals applied to the camera, a method for increasing the effective sensitivity of the camera, comprising the steps of:
    disabling the scanning beam of said television camera during a predetermined non-unity fraction of a series of field times so that in the output of said camera a regular video field is followed by at least one blanked-out video field;
    inserting an identifying signal in each blanked-out field; and
    generating, during occurrence of each blanked-out field, and in response to said identifying signal, a substitute video field derived from a previously occurring regular video field.

12. The method as defined by claim 11, wherein said step of generating a substitute video field during the occurrence of each blanked out field comprises:
    storing a regular video field;
    detecting the identifying signal of each blanked-out video field; and
    reading out the stored video during the field time of the identified blanked-out video field.

13. The method as defined by claim 12, further comprising the step of sequentially combining regular video fields and generated substitute video fields.

14. The method as defined by claim 11, wherein said disabling step comprises blanking out two out of every three video fields so that a regular video field is followed by two blanked-out fields.

15. The method as defined by claim 13, wherein said disabling step comprises blanking out two out of every three video fields so that a regular video field is followed by two blanked-out fields.

16. Apparatus as defined by claim 10 further comprising a system for processing the recorded television signal to obtain an output television signal, including:
    means responsive to the recorded television signal for storing a regular video field;
    means responsive to the recorded television signal for detecting the identifying signal of each blanked-out video field;
    means for reading out the stored video field during the field time of the identified blanked-out video field; and
    means for combining the recorded television signal and the read-out stored video field to obtain an output television signal.

* * * * *